L. G. STONE.

AIR COMPRESSOR.

APPLICATION FILED SEPT. 19, 1913.

Reissued Nov. 11, 1913.

13,645.

2 SHEETS—SHEET 1.

Witnesses:

G. M. Clement

E. C. Trautman

Inventor:

Louis G. Stone by Wm. M. Cady

Att'y

COLUMBIA PLANOGRAPH CO., WASHINGTON, D. C.

L. G. STONE.

AIR COMPRESSOR.

APPLICATION FILED SEPT. 19, 1913.

Reissued Nov. 11, 1913. 13,645.

2 SHEETS—SHEET 2.

Witnesses:
A. M. Clements.
E. C. Trautman

Inventor:
Louis G. Stone
by Wm. M. Cady
Att'y

COLUMBIA PLANOGRAPH CO., WASHINGTON, D. C.

UNITED STATES PATENT OFFICE.

LOUIS G. STONE, OF LONDON, ENGLAND, ASSIGNOR TO THE WESTINGHOUSE AIR BRAKE COMPANY, OF PITTSBURGH, PENNSYLVANIA, A CORPORATION OF PENNSYLVANIA.

AIR-COMPRESSOR.

13,645. Specification of Reissued Letters Patent. Reissued Nov. 11, 1913.

Original No. 1,070,929, dated August 19, 1913, Serial No. 550,602. Application for reissue filed September 19, 1913. Serial No. 790,659.

*To all whom it may concern:*

Be it known that I, LOUIS G. STONE, a subject of the King of Great Britain, residing in London, England, have invented a certain new and useful Improvement in Air-Compressors, of which the following is a specification.

This invention relates to fluid compressors and particularly to that type of compressor in which the fluid to be compressed passes through a plurality of stages before being delivered to the storage reservoir.

Considerable difficulty has hitherto arisen in providing a compressor of this type, of suitable size and weight, and an object of the present invention is to so arrange the parts of which the compressor is composed that a material saving of space may be effected.

A further object of the invention is to provide improved means for effectively cooling those parts of the compressor which are subjected to the influence of the compressed and consequently heated fluid.

According to the invention, the fluid to be compressed is passed through three separate stages, the compression and delivery of the fluid being effected by means of a piston sliding within a cylinder so constructed and arranged that three separate chambers are formed within a single casing.

In order that the invention may be clearly understood, it will now be described with reference to the accompanying drawings, in which—

Figure 1:
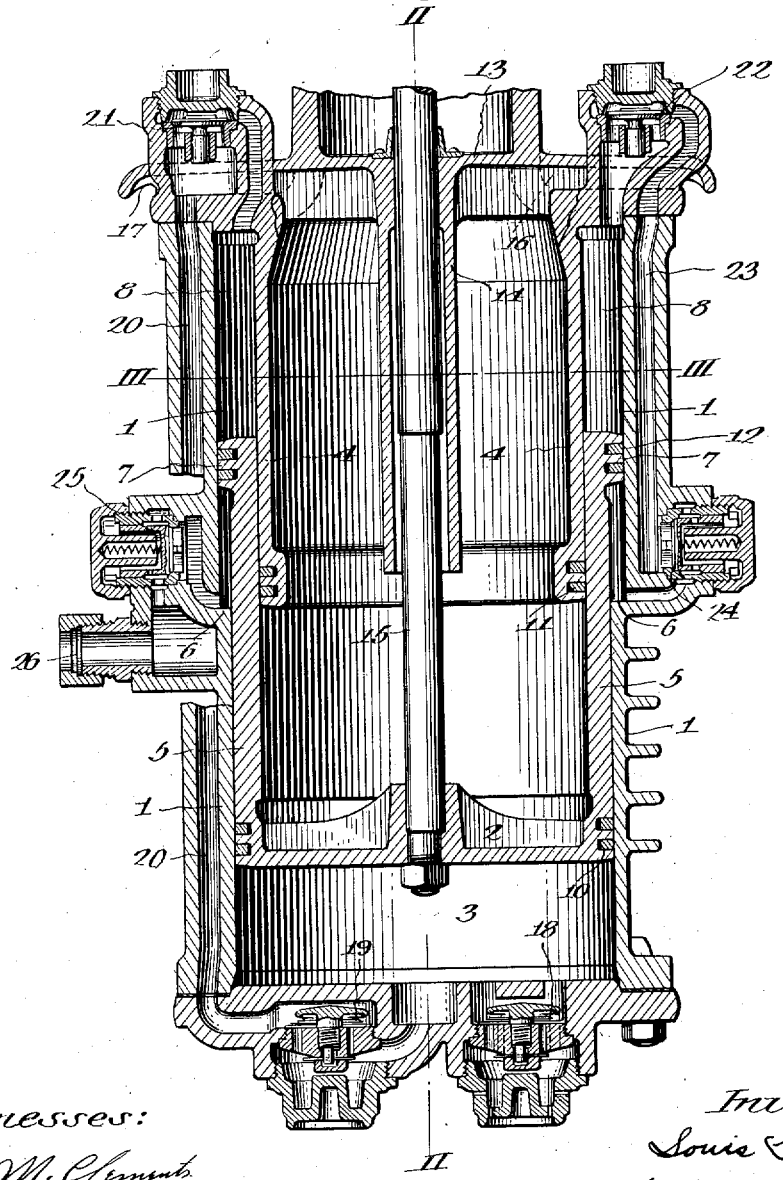
Figure 2:
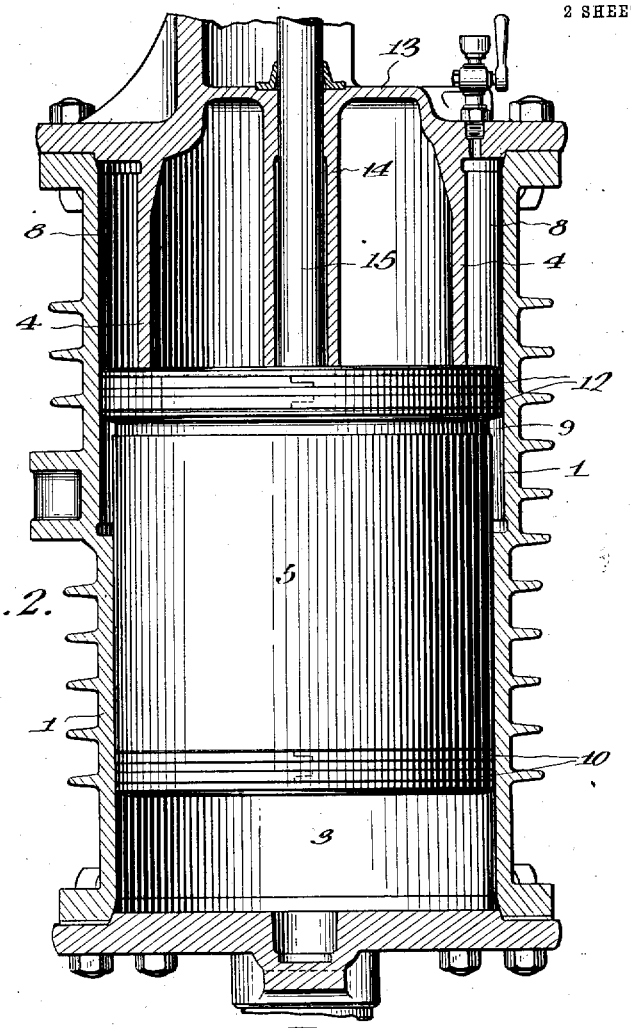
Figure 3:
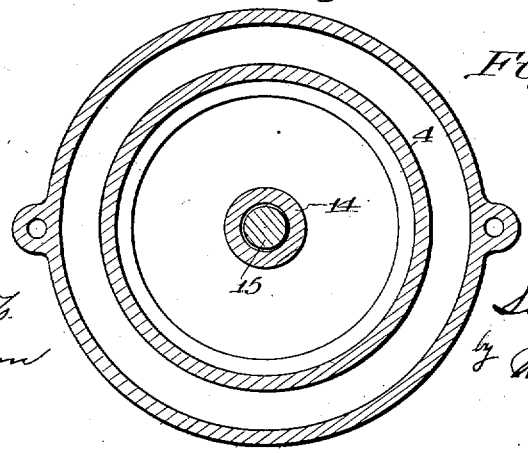

Figure 1 is a sectional elevation of a fluid compressor constructed in accordance with the invention; Fig. 2 a section on the line II—II Fig. 1; and Fig. 3 a section on the line III—III Fig. 1.

1 is a cylinder within which a trunk piston 2 is adapted to slide, the space 3 between the piston and the cylinder head forming the suction chamber, in which the first stage of the compression takes place. At the opposite end of the cylinder an internally projecting cylindrical portion 4 is provided, which extends approximately half way along the cylinder; the outside of this cylindrical portion engages with the inside of the trunk 5 of the piston 2. The portion of the cylinder wall opposite to the part 4 is enlarged in diameter so that an annular shoulder 6 is formed at this point half way along the cylinder, and the upper portion of the trunk 5 is provided with an externally projecting flange 7, engaging with the enlarged portion of the cylinder, so that two annular chambers, 8 and 9, are formed between the internally projecting portion 4 and the enlarged portion of the cylinder wall. Suitable packing rings indicated at 10, 11 and 12 are provided for the piston 2, at the inner end of the annular portion 4 and the outer end of the trunk 5 respectively. The cylinder is provided with a cover 13 preferably formed integrally with the part 4 and having an internally projecting guide 14 for the piston rod 15, inlets 16, 17 being provided, through which air can be drawn into and forced out of the space within the annular portion 4 and the piston trunk 5 as the piston is moved up and down in the cylinder. This air serves as a very efficient medium for cooling the inside of said annular portion and the piston trunk.

The piston rod 15 may be connected to any suitable motor for driving the compressor; for example, a steam cylinder with the appropriate valves and fittings may be supported from the plate 13.

The compression chambers are provided with inlet and outlet valves, as follows: The inlet valve to the chamber 3 through which air passes from the atmosphere is indicated at 18 and the outlet valve from this chamber at 19. From the outlet valve 19 a conduit 20 leads to the valve 21 which forms the inlet of the intermediate chamber 8 and from said intermediate chamber an outlet valve 22 permits the air compressed therein to pass to the conduit 23. This conduit leads to the inlet valve 24 of the final chamber 9 from which the air passes through an outlet valve 25 to the delivery pipe 26.

The valves may be of any suitable type adapted to withstand the various pressures to which they are subjected in working, those shown in the drawings being merely illustrative of valves suitable for the purpose.

The operation of the compressor is very simple, and is as follows: On the up-stroke of the piston 2, air is drawn into the first compression chamber 3 from the atmosphere through the inlet valve 18, on the succeeding down-stroke the air in this chamber is compressed and finally forced out through the outlet valve 19, the conduit 20 and the inlet valve 21 to the intermediate chamber 8, which at this point will have its maximum capacity; the succeeding upward stroke of the piston will draw in a fresh supply of air from the atmosphere to chamber 3, and will compress the air already admitted into chamber 8, finally forcing this latter air out through the valve 22, conduit 23 and valve 24 into the final compression or delivery chamber 9. The capacity of the chamber 9 continually increases during the upstroke of the piston, but during the succeeding down-stroke the air therein is finally forced through the delivery valve 25 into the outlet for compressed air at 26.

The relative sizes of the compression chambers are determined by the diameter of the piston 2, the radial depth of the shoulder 6 and the thickness of the trunk 5, and these dimensions can be arranged so that the work of compression and delivery is properly divided between the three chambers.

It will be observed that compressors constructed according to this invention are very compact, and that both the external and internal walls of the compression chambers are very efficiently cooled owing to the free circulation of air from the atmosphere which takes place in the internally projecting part 4 and the piston trunk 5. Furthermore, owing to the provision of packing rings as hereinbefore described, the use of packing glands customarily employed in compressors of this description is dispensed with.

The compressor shown in the drawings is intended for compressing air, but the invention is not limited in this respect, as it is clear that the apparatus may be employed for compressing other fluids if desired.

Having now described my invention, what I claim as new and desire to secure by Letters Patent, is:—

1. A fluid compressor comprising a casing having a main piston chamber and an annular chamber, a piston provided with a main piston head adapted to operate in the main chamber and an annular piston head adapted to operate in the annular chamber, an inlet valve for the main piston chamber, an outlet valve and an inlet valve for controlling a passage from the main chamber to the annular chamber, and an outlet valve for controlling the outflow of fluid from the annular chamber.

2. A three stage fluid compressor comprising a casing having a main piston chamber and an annular chamber, a piston provided with a main piston head adapted to compress fluid in the main chamber and an annular piston head adapted to compress fluid in the annular chamber and also in a second annular chamber formed by the piston, an inlet controlling valve for the main piston chamber, an outlet valve therefor and an inlet valve for the first annular chamber for controlling a passage from the main to said annular chamber, an outlet valve and an inlet valve for controlling a passage from said annular chamber to said second annular chamber, and an outlet valve for said second annular chamber.

3. A three stage compressor comprising a casing having a main piston chamber and an annular piston chamber, a piston provided with a main piston head adapted to operate in the main piston chamber and an annular piston head adapted to operate in said annular piston chamber, said annular piston head being adapted to form a second annular piston chamber, and valve means for controlling the flow of fluid into said main piston chamber, from said main chamber to the first annular chamber, and from said annular chamber to said second annular chamber.

4. A fluid compressor comprising a casing having a main piston chamber and an annular piston chamber, a piston provided with a main piston head adapted to operate in the main piston chamber and an annular piston head adapted to operate in the annular piston chamber, said piston and casing forming an interior chamber on one side of the main piston head having free communication with the atmosphere, to permit inflow and outflow of air to said chamber upon movement of the piston, thereby effecting a cooling action on the compressor parts.

5. A fluid compressor comprising a casing having a main piston chamber and an annular piston chamber, a piston provided with a main piston head adapted to operate in the main piston chamber and an annular piston head adapted to operate in the annular piston chamber, an interior chamber formed by the piston and the inner wall of said annular piston chamber, said interior chamber being in free communication with the atmosphere thereby causing the movement of the piston to effect inflow and outflow of air to and from said interior chamber for thereby cooling said annular chamber.

In testimony whereof I have hereunto set my hand.

LOUIS G. STONE.

Witnesses:
Wm. O. Brown,
Fredk. Hutchings.

Copies of this patent may be obtained for five cents each, by addressing the "Commissioner of Patents, Washington, D. C."